(12) United States Patent
Park et al.

(10) Patent No.: US 11,024,312 B2
(45) Date of Patent: *Jun. 1, 2021

(54) APPARATUS, SYSTEM, AND METHOD FOR GENERATING VOICE RECOGNITION GUIDE BY TRANSMITTING VOICE SIGNAL DATA TO A VOICE RECOGNITION SERVER WHICH CONTAINS VOICE RECOGNITION GUIDE INFORMATION TO SEND BACK TO THE VOICE RECOGNITION APPARATUS

(71) Applicant: SAMSUNG ELECTRONICS CO., LTD., Suwon-si (KR)

(72) Inventors: Jong-cheol Park, Suwon-si (KR); Do-wan Kim, Gunpo-si (KR); Sang-shin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,747

(22) Filed: Mar. 11, 2020

(65) Prior Publication Data
US 2020/0211559 A1    Jul. 2, 2020

Related U.S. Application Data

(63) Continuation of application No. 14/276,054, filed on May 13, 2014, now Pat. No. 10,629,196.

(30) Foreign Application Priority Data

May 21, 2013  (KR) .................. 10-2013-0057274

(51) Int. Cl.
*G10L 15/22*        (2006.01)
(52) U.S. Cl.
CPC ........ *G10L 15/22* (2013.01); *G10L 2015/223* (2013.01); *G10L 2015/225* (2013.01)

(58) Field of Classification Search
CPC .............. G10L 15/22; G10L 2015/225; G10L 2015/223
(Continued)

(56) References Cited

U.S. PATENT DOCUMENTS 4,862,498 A    8/1989  Reed
8,346,537 B2   1/2013  Chino et al.
(Continued)

FOREIGN PATENT DOCUMENTS

EP    2355093 A2   8/2011
JP    07219587 A   8/1995
(Continued)

OTHER PUBLICATIONS

Communication dated Aug. 12, 2015 issued by European Patent Office in counterpart European Patent Application No. 14 165 880.7.
(Continued)

*Primary Examiner* — Thierry L Pham
(74) *Attorney, Agent, or Firm* — Sughrue Mion, PLLC

(57) ABSTRACT

A voice recognition apparatus includes a communication part configured to communicate with a voice recognition server, a voice receiver configured to receive a user's voice signal, a storage part configured to store guide information comprising at least an example command for voice recognition; and a controller. The controller is configured to generate a guide image comprising at least a part of the example command, transmit the received user's voice signal to the voice recognition server through the communication part in response to receiving the user's voice signal by the voice receiver, and update the stored guide information based on update information received through the communication part.

25 Claims, 5 Drawing Sheets

(58) Field of Classification Search
USPC .......................................................... 704/231
See application file for complete search history.

(56) References Cited

U.S. PATENT DOCUMENTS

| | | | |
|---|---|---|---|
| 8,949,902 | B1 | 2/2015 | Fabian-Isaacs et al. |
| 9,035,884 | B2 | 5/2015 | Phillips et al. |
| 9,721,587 | B2 | 8/2017 | Klein et al. |
| 9,786,281 | B1 | 10/2017 | Adams et al. |
| 10,347,246 | B2 | 7/2019 | Lee et al. |
| 10,629,196 | B2 * | 4/2020 | Park .................. G10L 15/22 |
| 2003/0163321 | A1 | 8/2003 | Mault |
| 2003/0182131 | A1 | 9/2003 | Arnold et al. |
| 2003/0191629 | A1 | 10/2003 | Yoshizawa |
| 2003/0234737 | A1 | 12/2003 | Nelson et al. |
| 2004/0193426 | A1 | 9/2004 | Maddux et al. |
| 2006/0106614 | A1 | 5/2006 | Mowatt et al. |
| 2007/0033055 | A1 | 2/2007 | Tanaka |
| 2007/0188472 | A1 | 8/2007 | Ghassabian |
| 2007/0282612 | A1 | 12/2007 | Kaneko et al. |
| 2008/0154612 | A1 | 6/2008 | Evermann et al. |
| 2009/0030691 | A1 | 1/2009 | Cerra et al. |
| 2009/0112592 | A1 | 4/2009 | Candelore |
| 2010/0333163 | A1 | 12/2010 | Daly |
| 2012/0042343 | A1 | 2/2012 | Laligand et al. |
| 2013/0219333 | A1 | 8/2013 | Palwe et al. |

FOREIGN PATENT DOCUMENTS

| | | | |
|---|---|---|---|
| JP | 2004-295017 | A | 10/2004 |
| JP | 2007094086 | A | 4/2007 |
| KR | 100632400 | B1 | 10/2006 |

OTHER PUBLICATIONS

Communication dated Aug. 21, 2014, issued by the European Patent Office in counterpart European Application No. 14165880.7.
Communication dated Feb. 7, 2017 issued by the European Patent Office in counterpart European Patent Application No. 14165880.7.
Communication dated Jul. 12, 2017, issued by the European Patent Office in counterpart European Patent Application No. 14165880.7.
Notice of Allowance dated Jul. 30, 2014, issued by the Korean Intellectual Property Office in counterpart Korean Application No. 10-2013-0057274.
Office Action dated Apr. 17, 2014, issued by the Korean Intellectual Property Office in counterpart Korean Application No. 10-2013-0057274.
Office Action dated Sep. 10, 2014, issued by the European Patent Office in counterpart European application No. 14165880.7.
Office Action dated Oct. 8, 2015, issued by the U.S. Patent and Trademark Office in parent U.S. Appl. No. 14/276,054.
Office Action dated Mar. 30, 2016, issued by the U.S. Patent and Trademark Office in parent U.S. Appl. No. 14/276,054.
Office Action dated Aug. 10, 2016, issued by the U.S. Patent and Trademark Office in parent U.S. Appl. No. 14/276,054.
Office Action dated Feb. 21, 2017, issued by the U.S. Patent and Trademark Office in parent U.S. Appl. No. 14/276,054.
Office Action dated Jun. 30, 2017, issued by the U.S. Patent and Trademark Office in parent U.S. Appl. No. 14/276,054.
Office Action dated Dec. 28, 2017, issued by the U.S. Patent and Trademark Office in parent U.S. Appl. No. 14/276,054.
Office Action dated Dec. 21, 2018, issued by the U.S. Patent and Trademark Office in parent U.S. Appl. No. 14/276,054.
Office Action dated Apr. 16, 2019, issued by the U.S. Patent and Trademark Office in parent U.S. Appl. No. 14/276,054.
Advisory Action dated Jun. 21, 2019, issued by the U.S. Patent and Trademark Office in parent U.S. Appl. No. 14/276,054.
Notice of Allowance dated Sep. 18, 2019, issued by the U.S. Patent and Trademark Office in parent U.S. Appl. No. 14/276,054.
Notice of Allowance dated Dec. 11, 2019, issued by the U.S. Patent and Trademark Office in parent U.S. Appl. No. 14/276,054.

\* cited by examiner

APPARATUS, SYSTEM, AND METHOD FOR GENERATING VOICE RECOGNITION GUIDE BY TRANSMITTING VOICE SIGNAL DATA TO A VOICE RECOGNITION SERVER WHICH CONTAINS VOICE RECOGNITION GUIDE INFORMATION TO SEND BACK TO THE VOICE RECOGNITION APPARATUS

CROSS-REFERENCE TO RELATED APPLICATIONS

This is a Continuation Application of U.S. application Ser. No. 14/276,054, filed May 13, 2014, now U.S. Pat. No. 10,629,196 issued Apr. 21, 2020, which claims priority from Korean Patent Application No. 10-2013-0057274, filed on May 21, 2013 in the Korean Intellectual Property Office, the disclosures of which are incorporated herein by reference in their entireties.

BACKGROUND

Field

Apparatuses and methods consistent with exemplary embodiments relate to a voice recognition apparatus and a voice recognition guide method, and more particularly, to a voice recognition apparatus which is capable of receiving a user's voice and performs voice recognition with respect thereto and voice recognition guide method which is performed by the voice recognition apparatus.

Description of the Related Art

Voice recognition technology is able to recognize a voice signal, which is obtained by collecting a vocalization from a user, etc., and may convert the vocalization into data corresponding to a predetermined language in a text format, and has been used in various fields. Further, voice recognition technology may be considered by some easier to use than a conventional input mode such as pressing a particular button with fingers, and is therefore used in electronic devices such as television (TV) and mobile phones to supplement, and in some cases replacing, the conventional input mode. For example, a user may speak a particular word or phrase, such as "channel up," with the intent of changing a channel of a TV, and the TV may change the channel by recognizing the user's voice signal. The development of voice recognition technology has progressed such that enhancements have developed in the scope of recognizable voice signals which may be recognized through a voice recognition engine. Compared to the recognition of a limited number of specific words in the past, recent voice recognition technology may recognize relatively longer sentences and the degree of accuracy of the voice recognition has improved. Because a complicated processing operation may be required to recognize such long sentences, a voice signal may be transmitted to an additional voice recognition server for processing rather than being processed by the device itself, and a voice recognition result may be provided by the voice recognition server to the concerned device.

However, even if the voice recognition is performed through the voice recognition server, not all of voice signals are recognized accurately, and a voice recognition result may be accurate with respect to only a particular word or sentence out of similar words or sentences.

Further, voice recognition systems do not provide any guide on words or sentences with respect to indicating the degree of accuracy of the voice recognition result being high. As a result, a user may not obtain an accurate voice recognition result even if he/she inputs a voice for recognition.

SUMMARY

According to an aspect of an exemplary embodiment, there is provided a voice recognition apparatus including a communication part configured to communicate with a voice recognition server, a voice receiver configured to receive a user's voice signal, a storage part configured to store guide information including at least an example command for voice recognition, and a controller configured to generate a guide image including at least a part of the example command, transmit the received user's voice signal to the voice recognition server through the communication part in response to receiving the user's voice signal by the voice receiver, and update the stored guide information based on update information received through the communication part.

The guide information may further include an example command corresponding to a voice that may be recognized through the voice recognition server.

The controller may be further configured to control the communication part to request the voice recognition server transmit the update information to the voice recognition apparatus in response to the voice recognition apparatus being turned on.

The controller may be further configured to control generating and displaying of the guide image in response to the voice receiver being turned on.

The voice receiver may be further configured to receive a voice signal from an external microphone, and wherein the controller may be further configured to generate and display the guide image in response to the voice receiver being connected to the external microphone for communication.

The voice recognition server may be configured to receive the user's voice signal from a plurality of voice recognition apparatuses, process the user's voice signal, generate voice recognition data based on the user's voice signal, and store the voice recognition data as an example command list.

The voice recognition server may be further configured to generate the update information based on the stored example command list.

The voice recognition server may be further configured to generate the update information based on a frequently input command out of the stored example command list.

The voice recognition server may be configured to generate the update information based on user characteristics of the voice recognition apparatus that transmitted the user's voice signal.

According to an aspect of another exemplary embodiment, there is provided a voice recognition server including a communication part configured to receive a voice signal from at least one voice recognition apparatus and transmit voice recognition data, a voice recognition part configured to perform voice recognition with respect to the voice signal and generate the voice recognition data, a storage part configured to store an example command list based on the voice recognition data, and a controller configured to generate update information based on the example command list, and control the communication part to transmit the update information to the at least one voice recognition apparatus.

The controller may be further configured to generate the update information based on a frequently input command, and wherein the frequently input command may be stored in the example command list.

The controller may be further configured to generate the update information corresponding to user characteristics of the voice recognition apparatus that transmitted the voice signal.

According to an aspect of another exemplary embodiment, there is provided a voice recognition guide method including receiving, at a voice recognition server, a user's voice signal from at least one voice recognition apparatus, generating, at the voice recognition server, voice recognition data by performing voice recognition based on the user's voice signal and storing an example command list based on the voice recognition data, generating, at the voice recognition server, update information based on the stored example command list, transmitting the update information to the voice recognition apparatus, updating guide information, at the voice recognition apparatus, based on the example command list and the update information, and displaying the updated guide information.

The voice recognition guide method may further include requesting, by the voice recognition apparatus, that the voice recognition server transmit the update information in response to the voice recognition apparatus being turned on.

The voice recognition guide method may further include generating, at the voice recognition server, the update information based on a frequently input command out of the stored example command list.

The voice recognition guide method may further include generating, at the voice recognition server, update information based on user characteristics of the voice recognition apparatus that transmitted the voice signal.

The voice recognition guide method may further include displaying, by the voice recognition apparatus, the guide information in response to a voice receiver that receives a user's voice signal being turned on.

The voice recognition guide method may further include generating and displaying, at the voice recognition apparatus, the guide information in response to the voice receiver being connected to an external microphone for communication.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
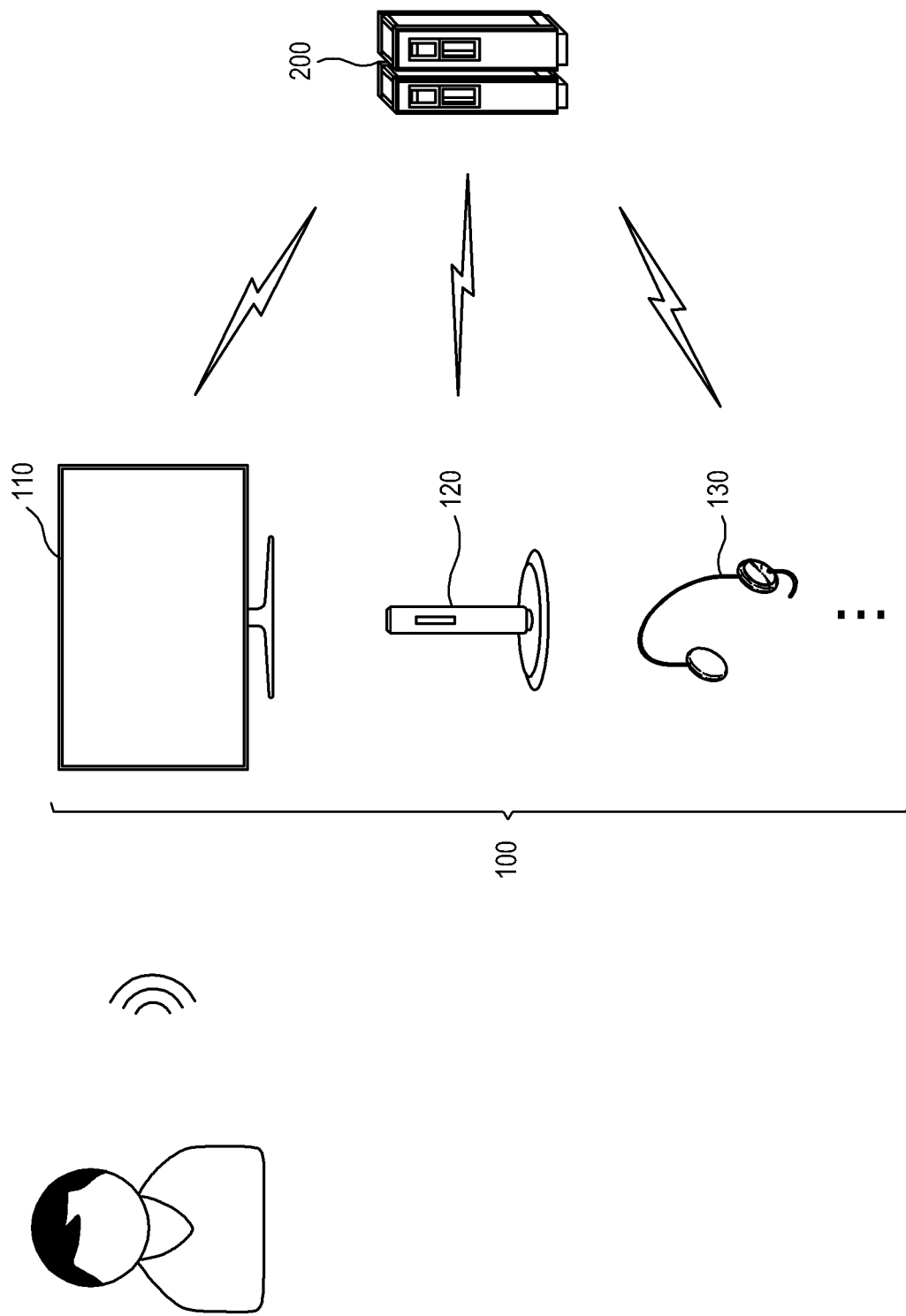
FIG. 1 illustrates a voice recognition apparatus and a voice recognition server according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates a voice recognition apparatus 100 and a voice recognition server 200 according to an exemplary embodiment.

As shown therein, a system according to an exemplary embodiment includes the voice recognition apparatus 110 and the voice recognition server 200. Additionally, the system may include other voice recognition apparatuses such as a standalone microphone 120 or a headset with an integrated microphone 130 providing a plurality of voice recognition apparatuses 100 through which a user can choose to input a vocalization for voice recognition processing.

For example, if a user speaks in an attempt to execute a voice recognition function, a user's voice may be collected through a microphone provided in the bezel of the voice recognition apparatus 110 or through an external microphone such as the microphone 120. A voice receiver of the voice recognition apparatus 100 may convert the collected voice into a voice signal, and the voice signal may then be transmitted to the voice recognition server 200 after a series of processes.

The voice recognition server 200 may perform a voice recognition process according to a predetermined algorithm and convert the voice signal into voice recognition data including a text version of the data in the form of words or sentences. As an example of a voice recognition process, the voice recognition server 200 may classify a voice signal into sections each having a consistent length, analyze the sound of each section, and extract parameters which may include, for example, a frequency spectrum and voice power. Also, the voice recognition server 200 may divide the voice signal into phonemes, and recognize the phonemes based on the parameter of the divided phonemes. The voice recognition server 200 may store a list in advance corresponding to particular phonemes, check whether the recognized phoneme is included in the list, and generate voice recognition data in the form of words or sentences by using the recognition result of the phonemes. This corresponds to an example of the voice recognition process and may employ various known voice recognition algorithms.

The voice recognition server 200 may be connected to a plurality of voice recognition apparatuses 100. The voice recognition server 200 may receive a voice signal from the plurality of connected voice recognition apparatuses 100, perform a voice recognition process with respect to the received voice signal and transmit the voice signal to the plurality of voice recognition apparatuses 100. As will be described below, the voice recognition server 200 may generate guide information including a predetermined example command list based on a voice recognition result of the voice signal provided by the plurality of voice recognition apparatuses 100, and update information for updating the guide information, and transmit the guide information and the update information to the plurality of voice recognition apparatuses 100, and the plurality of voice recognition apparatus 100 may display the guide information if they have such means to do so, such as a display portion.

There are various languages that may be expressed by human beings, and it is unlikely that one may be stored in the voice recognition server 200 which contains a language list corresponding to all voice signals. As a result, even if a voice recognition algorithm is performed by the voice recognition server 200, the performance result may not be output. Voice recognition data stored in the voice recognition server 200, according to an exemplary embodiment, may be stored as an example command list, and such data may be words and sentences generated through the voice recognition process, and a voice signal corresponding to the same example command may show a high voice recognition rate. Accordingly, if an example command is displayed by one of the plurality of voice recognition apparatuses 100 and a user speaks the displayed example command which is received by the voice recognition apparatus, the voice recognition rate may be increased and a user is therefore more likely to obtain a desired result.

According to another exemplary embodiment, one or more of the plurality of voice recognition apparatuses 100 may include an embedded voice recognition engine therein to perform the voice recognition process. In this embodiment, a received voice signal may be recognized by, for example, the voice recognition apparatus 110 on its own, and therefore the voice signal does not need to be transmitted to the voice recognition server 200. Even in this exemplary embodiment, the voice recognition apparatus 110 may receive guide information from the voice recognition server 200 and display the guide information.

Hereinafter, a detailed configuration of any one of the voice recognition apparatuses 100 and the voice recognition server 200 according to an exemplary embodiment will be described.

Figure 2:
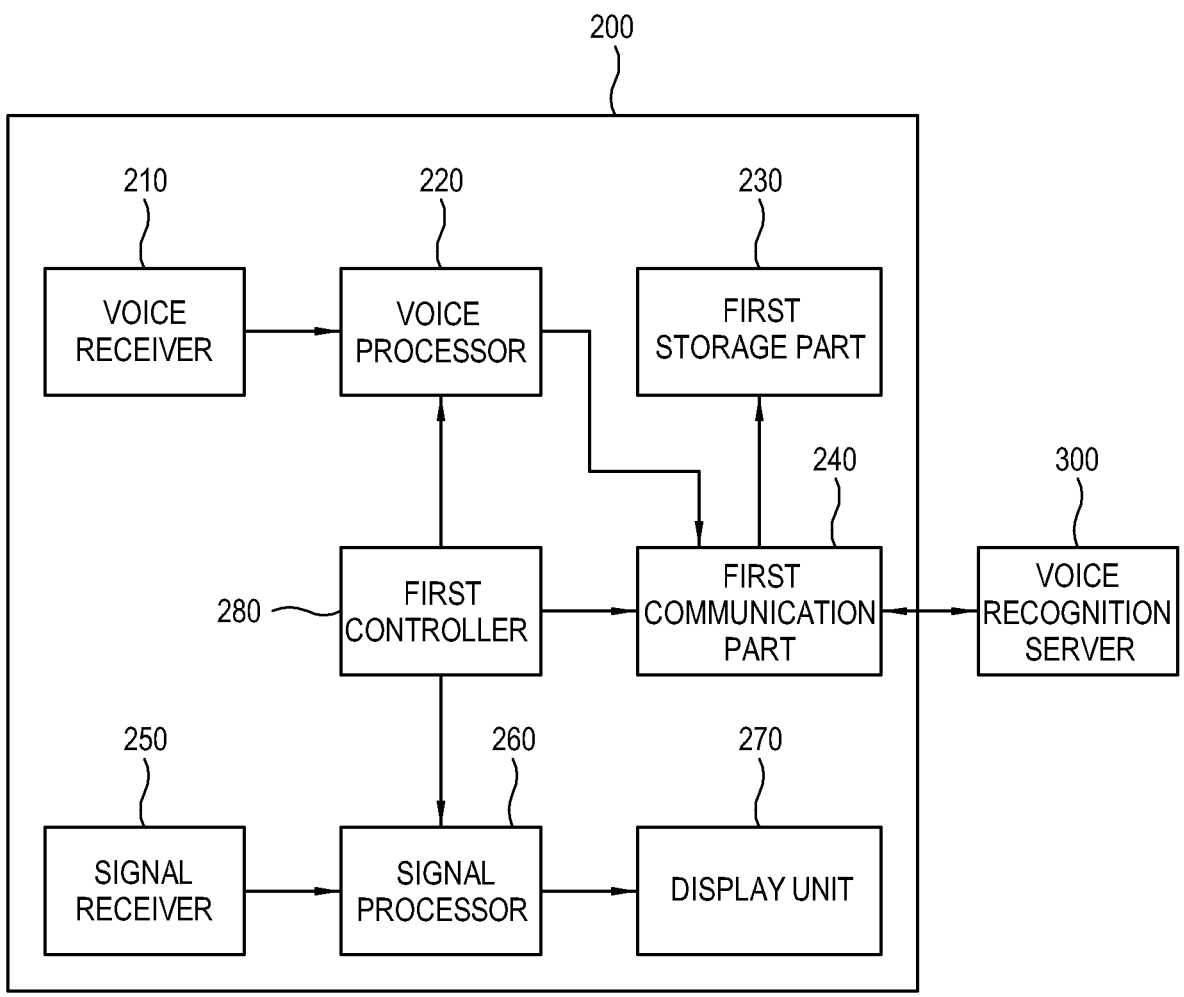
FIG. 2 is a control block diagram of the voice recognition apparatus according to an exemplary embodiment.

FIG. 2 is a control block diagram of at least one of the plurality of voice recognition apparatuses 100 according to an exemplary embodiment.

As shown therein, a voice recognition apparatus 200 may include a voice receiver 210, a voice processor 220, a first communication part 240, a first storage part 230, a first controller 280, a signal receiver 250, a signal processor 260 and a display unit 270. The voice recognition apparatus 200 may be implemented as a display apparatus, including a digital TV (DTV), which receives and outputs an image signal and an audio signal. The voice recognition apparatus 200 may be otherwise implemented as an external input apparatus such as a blue-ray disk (BD) player, a digital versatile disk (DVD) player, or a set-top box which receives and processes an image signal and an audio signal and outputs the processed image signal and audio signal to an additional display apparatus.

The voice receiver 210 may receive a user's voice. The voice receiver 210 may be implemented as at least one microphone which may be provided on an external surface of the voice recognition apparatus 200, or as a unit for receiving a voice signal collected through a remote controller. The voice receiver 210 may include a codec to compress and/or convert a received voice signal into a digital signal and may be further configured to output the compressed and/or converted signal.

The voice processor 220 processes the received voice signal. The received voice signal may include various types of noises such as a noise from the surrounding environment in addition to a user's voice signal, and such noise should be removed in order to more accurately recognize the user's voice. The voice processor 220 processes the voice signal which may include the removal of noises from the voice signal. If the voice receiver 210 receives a plurality of voice signals through a plurality of microphones, it may extract a user's voice signal which is intended to be recognized, through beam-forming, source-separation, etc.

The first communication part 240 communicates with the voice recognition server 300. The first communication part 240 may include a wired or wireless communication module to perform a network communication based on an Internet protocol (IP). The first communication part 240 may transmit a user's voice signal to the voice recognition server 300, receive voice recognition data from the voice recognition server 300, and receive update information (to be described later) from the voice recognition server 300.

The first storage part 230 may storeguide information for voice recognition. The guide information may include a predetermined example command for voice recognition, which may include an example command corresponding to a voice that may be recognized through the voice recognition server 300. The first storage part 230 may be implemented as a known non-volatile memory such as a flash memory, and store therein other data in addition to the guide information.

In an exemplary embodiment, the guide information may include a predetermined example command for voice recognition, e.g., example commands which are made by a user to obtain information through the voice recognition such as "what program is best for today?" and "when is the drama A aired?" The voice recognition apparatus 200 displays at least a part of the example command including the guide information as described above and guides a user to refer to the example command and speak corresponding to the example command displayed by the voice recognition apparatus 300 when the voice recognition function is executed.

The signal receiver 250 receives image signals and audio signals from an external image source. For example, the signal receiver 250 may receive a radio frequency (RF) signal from a broadcasting station wirelessly, or receive signals in a wired manner according to standards such as composite video, component video, super video, SCART, high definition multimedia interface (HDMI), etc. The signal receiver 250 may be otherwise connected to a web server and receive a data packet of a web content therefrom.

The signal processor 260 processes the received image signals and audio signals according to image processing operations and audio processing operations. For example, the image processing operations of the signal processor 260 may include, without limitation, decoding, de-interlacing, scaling, noise reduction and detail enhancement. The signal processor 260 may be implemented as an image processing board in which a system-on-chip (SoC) that integrates the foregoing functions is mounted, or in which individual elements that independently perform the foregoing functions are mounted.

The display unit 270 displays an image thereon. The display unit 270 may be implemented as various displays including, without limitation, liquid crystal, plasma, light-emitting diode, organic light-emitting diode, etc. As described above, if the voice recognition apparatus 200 is implemented as an external input apparatus such as a BD/DVD player or a set-top box, the display unit 270, the signal receiver 250, and the signal processor 260 may be omitted.

The first controller 280 controls overall operations of the voice recognition apparatus 200 according to an exemplary embodiment. The first controller 280 may include, without limitation, e.g., a non-volatile memory for storing a control program therein, a volatile memory for loading the stored control program, and a microprocessor such as a central processing unit (CPU) and a micro control unit (MCU) for executing the loaded control program.

The first controller 280 may generate a guide image including at least a part of the example command included in the guide information, and may control the display unit 270 to display the guide image thereon. The example command which is included in the guide information may include a plurality of example commands provided by the voice recognition server 300. The first controller 280 may select a proper example command by assuming a user's intention, and generate a guide image including the selected example command. For example, the first controller 280 may generate a guide image by selecting a command corresponding to a voice that is input by a user, a command similar to a voice that has been input recently, and a command that is expected to be input at the current time. The guide image is formed in a separate layer from an image that is generated after the signal processor 260 processes a voice signal, and may be displayed in front of an image that is generated by the signal processor 260 when displayed on the display unit 270.

The first controller 280 may generate and display a guide image when a user executes the voice recognition function. For example, if the voice receiver 210 is implemented as a microphone that is provided on an external surface of the voice recognition apparatus 200, the first controller 280 may display guide information when the voice receiver 210 is turned on. If the voice receiver 210 is configured to receive a voice signal that is collected by an external microphone of a remote controller, the first controller 280 may display guide information upon a connection of the voice receiver 210 to the external microphone for wired/wireless communication. Otherwise, the first controller 280 may display guide information when a user presses a preset button of a remote controller or speaks a predetermined command to execute the voice recognition function.

If the voice receiver 210 receives a user's voice, the first controller 280 may control the first communication part 240 to transmit the received voice signal to the voice recognition server 300. The received voice signal may be transmitted after being processed by the voice processor 220, and a voice recognition result may be received through the first communication part 240 corresponding to the transmitted voice signal.

If update information is received through the first communication part 240 to update the guide information, the first controller 280 may update the stored guide information based on the received update information. In this case, if the voice recognition apparatus 200 is turned on, the first controller 280 controls the first communication part 240 to request the voice recognition server 300 transmit the update information, and may receive the update information from the voice recognition server 300. The update information is used to update at least a part of the guide information, and may be generated and transmitted by the voice recognition server 300. The first controller 280 may compare the guide information stored in the first storage part 230 and the update information received through the first communication part 240, add an example command to the guide information, replace an example command included in the guide information with an example command included in the update information to thereby update the guide information.

According to another exemplary embodiment, the voice recognition server 300 may be connected to a plurality of voice recognition apparatuses, generate voice recognition data by performing a voice recognition with respect to voice signals provided by the plurality of voice recognition apparatuses, and store the generated voice recognition data as an example command list. Further, the voice recognition server 300 may generate update information based on the stored example command list, and transmit the update information to the plurality of voice recognition apparatuses. The voice recognition server 300 may generate update information based on a frequently spoken command after the plurality of voice recognition apparatuses connected to the voice recognition server 300 perform a voice recognition. The voice recognition server 300 may generate updated information based on a user's characteristics of the voice recognition apparatus 200 which has transmitted a voice signal. A method of generating guide information and update information by the voice recognition server 300 will be described in detail as below.

Figure 3:
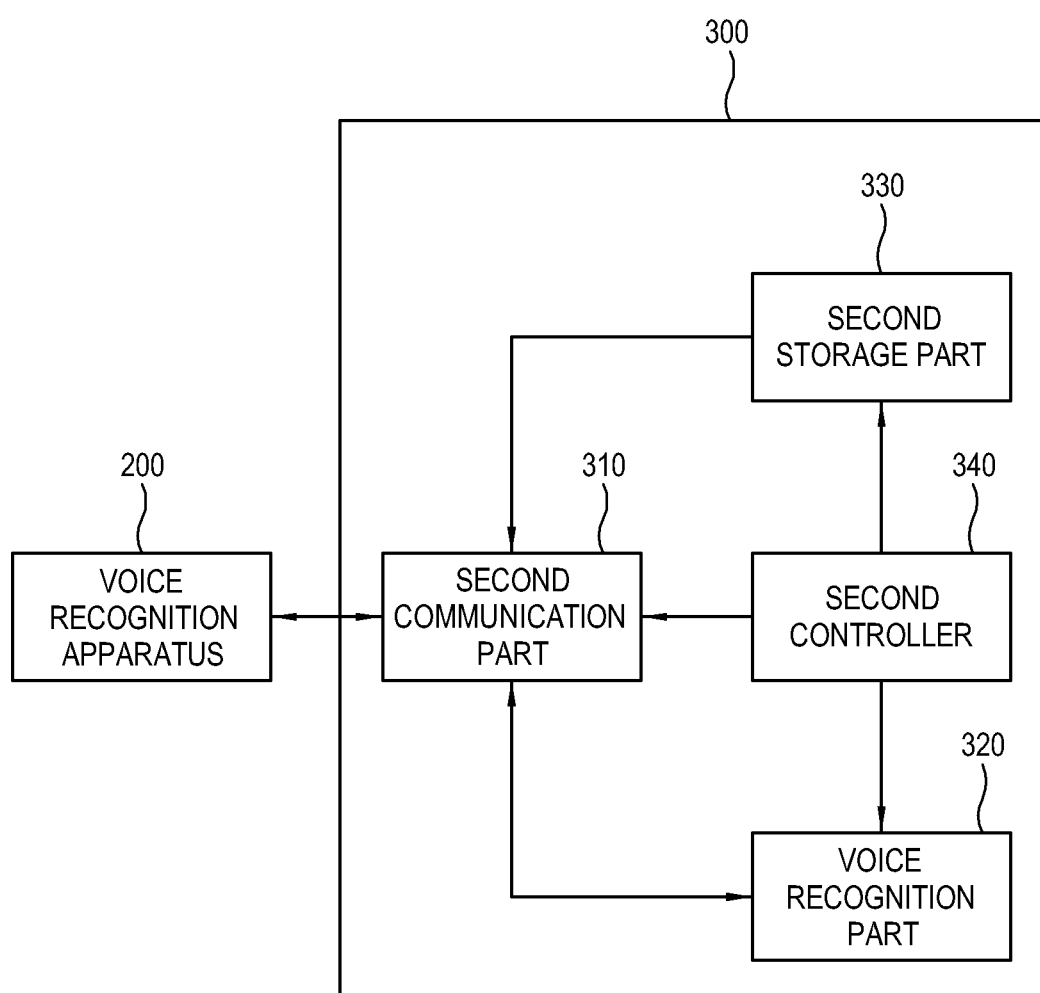
FIG. 3 is a control block diagram of the voice recognition server according to an exemplary embodiment.

FIG. 3 is a control block diagram of the voice recognition server 300 according to an exemplary embodiment.

As shown therein, the voice recognition server 300 may include a second communication part 310, a second storage part 330, a voice recognition part 320 and a second controller 340. The voice recognition server 300 may be connected to one of or the plurality of voice recognition apparatuses 100, as shown in FIG. 1, for example the voice recognition apparatus 200 as shown in FIG. 2, process a received voice signal according to a predetermined voice recognition algorithm and transmit voice recognition data to the respective voice recognition apparatuses 110, 120, 130, 200.

The second communication part 310 receives a voice signal from at least one voice recognition apparatus, for example the voice recognition apparatus 200 from FIG. 2 connected to the voice recognition server 300, and transmits a voice recognition result to the voice recognition apparatus 200 according to the processing result of the voice recognition part 320. The second communication part 310 performs an IP-based network communication with the voice recognition apparatus 200.

The voice recognition part 320 may perform a voice recognition process with respect to a voice signal received through the second communication part 310, and voice recognition data which have been generated through the voice recognition process may be stored in the second storage part 330. As an example of the voice recognition process, the voice recognition part 320 classifies a voice signal into sections in a consistent length, analyzes sound of each section, and extracts a parameter including a frequency spectrum and voice power. The voice recognition part 320 divides the voice signal into phonemes, and recognizes the phonemes based on the parameter of such divided phonemes. The voice recognition server 300 may store a list in advance corresponding to particular phonemes, check whether the recognized phoneme is included in the list, and generate voice recognition data in the form of words or sentences by using the recognition result of the phonemes. This corresponds to an example of the voice recognition process and may employ various known voice recognition algorithms.

The second storage part 330 stores therein an example command list based on voice recognition data which are generated by the voice recognition part 320. For example, the example command may include texts such as "what program is best for today?" or "when is the drama A aired?", and cumulative voice recognition results of the voice recognition part 320 may be stored. An operator of the voice recognition server 300 may additionally store a predetermined example command for a marketing purpose. Update information may be in the same form as the guide information stored in the first storage part 230 of the voice recognition apparatus 200 as show in FIG. 2.

The example command which is stored in the second storage part 330 may be a command that is generated and accumulated through the voice recognition process of the voice recognition part 320. It may be anticipated that a voice signal corresponding to the same example command shows a high voice recognition rate. Accordingly, if an example command is displayed by the voice recognition apparatus 200 and a user speaks the displayed example command, the voice recognition rate may be improved and a user is very likely to obtain a desired result.

The second controller 340 generates update information based on the example command list stored in the second storage part 330. In this case, the update information may be generated on the basis of commands that have been frequently input recently by users. According to another exemplary embodiment, update information including a predetermined example command that is stored by an operator of the voice recognition server 300 for a marketing purpose may be generated. The second controller 340 may generate update information based on a user's characteristics of the voice recognition apparatus 200. For example, if a user is a frequent viewer of a sports program through the voice recognition apparatus 200, the second controller 340 may select a command such as "what sport program is best for today?" to search a sports program, or select an example command based on a command that is frequently input by a user falling under the same group after receiving information such as a user's gender, age and hobby from the voice recognition apparatus 200. To do so, the voice recognition server 300 may receive a viewing history and user information from the voice recognition apparatus 200 and store such information in a separate area in the second storage part 330.

Figure 4:
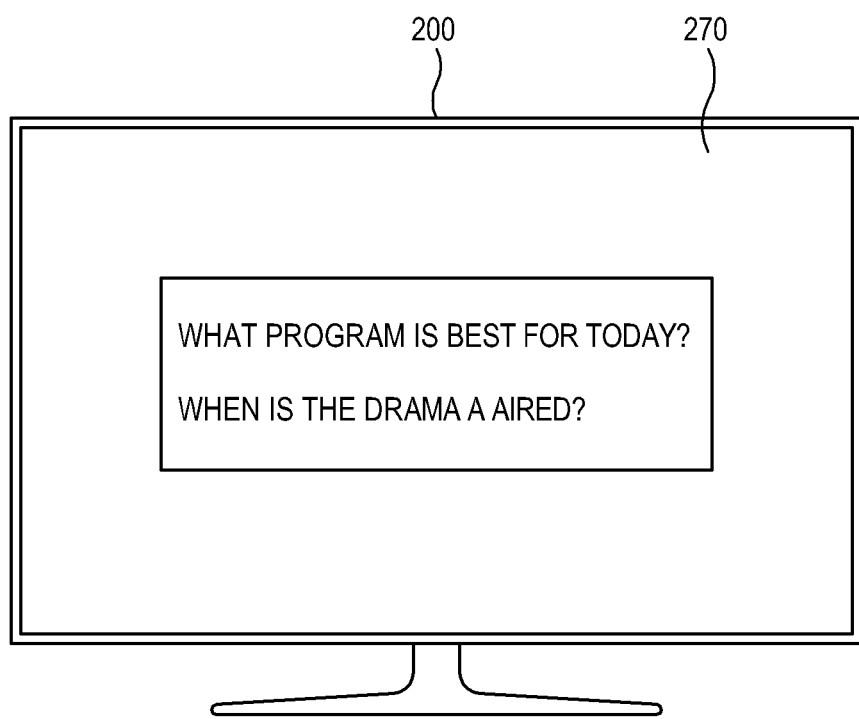
FIG. 4 illustrates an example of displaying a guide image according to an exemplary embodiment.

FIG. 4 illustrates an example of displaying a guide image by the voice recognition apparatus 200 according to an exemplary embodiment.

As described above, the voice recognition apparatus 200 may be implemented as a display apparatus such as a TV, in which case, it may include a display unit 270 to display an image thereon.

If a user desires to input a predetermined voice through the voice recognition apparatus 200, e.g., if the voice receiver 210 is turned on or connected to an external microphone for communication, the first controller 280 of the voice recognition apparatus 200 generates a guide image including an example command list, and displays the guide image on the display unit 270.

As shown therein, the guide image may include a predetermined example command such as "what program is best for today?" and "when is the drama A aired?" and may be displayed on the display unit 270. A user inputs a desired voice by referring to the example command when the guide image is displayed. If a user inputs a voice that is similar to the displayed example command, the voice recognition rate may be increased. The guide image serves to show a user an example of a sentence that may be recognized. Further, there may be little to no difficulty in executing the voice recognition function even if a user inputs a command that is different from the displayed example command.

Figure 5:
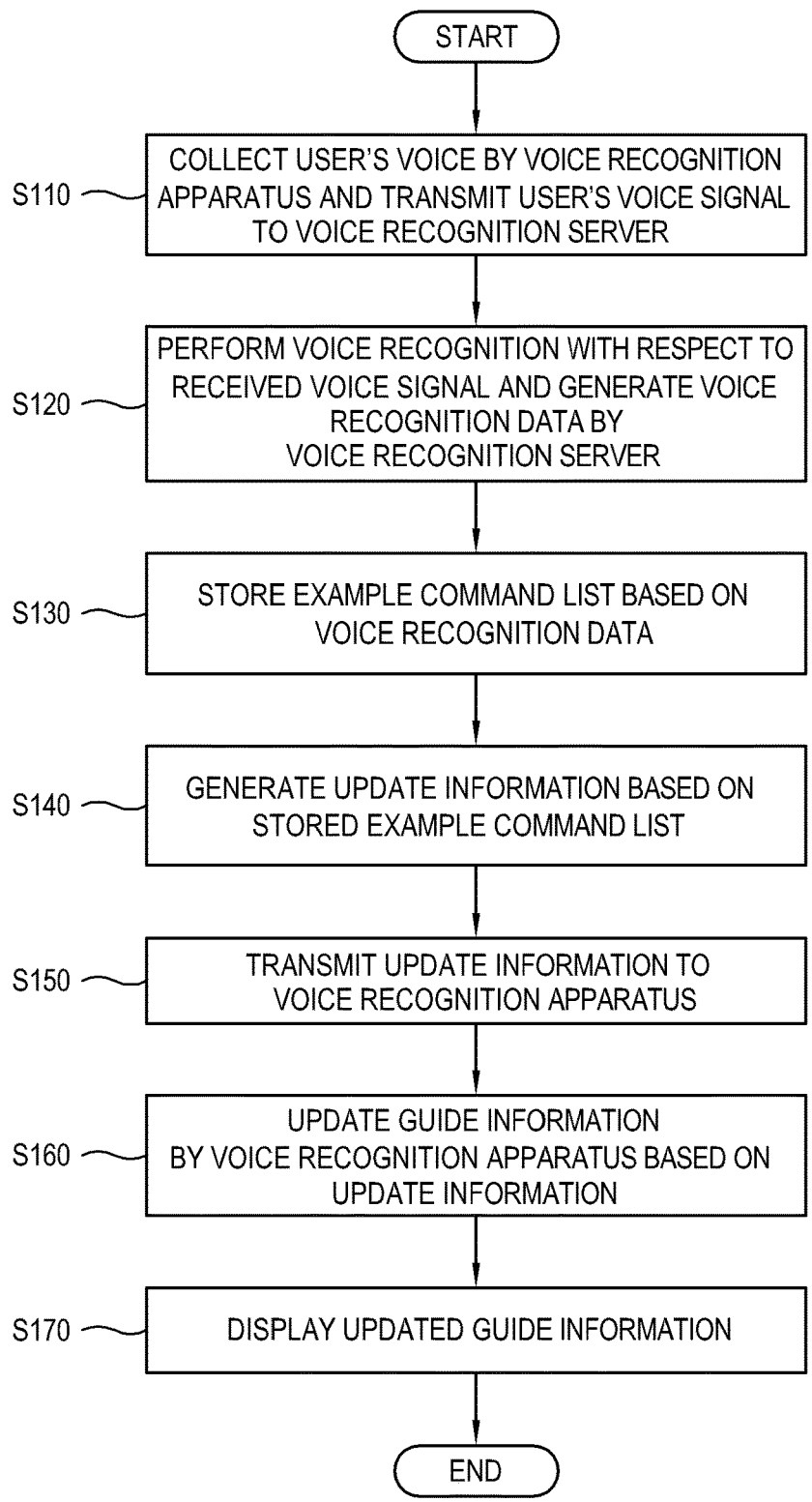
FIG. 5 is a flowchart showing a voice recognition guide method according to an exemplary embodiment.

FIG. 5 is a flowchart showing a voice recognition guide method according to an exemplary embodiment.

The voice recognition guide method may be implemented by the voice recognition apparatus 200, as shown in FIGS. 2 and 4, which receives a user's voice, and the voice recognition server 300, as shown in FIG. 3, which may receive a voice signal from the voice recognition apparatus 200 or a plurality of voice recognition apparatuses 100, as shown in FIG. 1, and transmits voice recognition data to the voice recognition apparatuses. The voice recognition apparatus 200 may be implemented as a display apparatus, including DTV, which receives and outputs an image signal and an audio signal. The voice recognition apparatus 200 may be otherwise implemented as an external input apparatus such as a BD/DVD player or a set-top box which receives and processes an image signal and an audio signal and outputs the processed image signal and audio signal to an additional display apparatus. The voice recognition server 300 performs a voice recognition process according to a predetermined algorithm, and converts a voice signal into voice recognition data including texts in the form of words or sentences. The voice recognition apparatus 200 may display guide information including at least one example command for voice recognition, and receive update information from the voice recognition server 300 to update guide information.

The voice recognition apparatus 200 collects a user's voice, and transmits a user's voice signal to the voice recognition server 300 (S110). The voice signal may be transmitted after being converted into a digital signal and after removing noise therefrom.

The voice recognition server 300 processes the received voice signal and generates voice recognition data therefrom (S120). The voice recognition server 300 stores therein the example command list based on the voice recognition data (S130). In addition to the example command, a predetermined example command may be separately stored by an operator of the voice recognition server for a marketing purpose.

The voice recognition server 300 generates the update information based on the stored example command list (S140). In this case, the update information may be generated on the basis of the commands which have been frequently input by users recently. According to another exemplary embodiment, the update information, including a predetermined example command that has been stored by an operator of the voice recognition server 300 for a marketing purpose, may be generated. The voice recognition server 300 may generate the update information based on a user's characteristics of the voice recognition apparatus 200. For example, if a user is a frequent viewer of sports programs through the voice recognition apparatus 200, the voice recognition server 300 may select a command such as "what sport program is best for today?" to search a sports program, or select the example command based on the command that is frequently input by a user and falling under the same group after receiving information such as a user's gender, age, and hobby from the voice recognition apparatus 200. To do so, the voice recognition server 300 may receive a viewing history and user information from the voice recognition apparatus 200 and store such information therein.

The voice recognition server 300 transmits the generated update information to the voice recognition apparatus 200 (S150).

The voice recognition apparatus 200 may update the stored guide information based on the update information transmitted by the voice recognition server 300 (S160). In this embodiment, if the voice recognition apparatus 200 is turned on, it may request that the voice recognition server 300 transmit the update information, and will accordingly receive the update information from the voice recognition server 300. The voice recognition apparatus 200 may compare the guide information stored therein and the update information transmitted by the voice recognition server 300, add an example command to the guide information, and replace an example command included in the guide information with an example command included in the update information to thereby update the guide information.

The voice recognition apparatus 200 may then display the updated guide information (S170).

According to an exemplary embodiment, a user receives the guide information, including the example command. Thus, the user may be guided to speak a command to thereby obtain a relatively accurate voice recognition result. Also, the guide information is updated by the voice recognition server and thus various example sentences may be provided to a user, and a provider of the voice recognition server may obtain indirect advertisement effect regarding the concerned service or content.

As described above, a voice recognition apparatus and a voice recognition guide method according to an exemplary embodiment may provide a guide for a user to obtain an accurate voice recognition result.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A display apparatus configured to communicate with a server, comprising:
   a memory;
   a display configured to display an image thereon; and
   a processor configured to execute programming instructions stored in the memory, which when executed by the processor cause the display apparatus to:
   while a function for voice recognition of the display apparatus is performed, provide a first guide image including first text information for guiding a voice utterance of a user;
   transmit, to the server, data representing a first voice input received through an external remote controller while the function for voice recognition is performed;
   after transmitting the data representing the first voice input, receive, from the server, a voice recognition result and second text information for guiding another voice utterance of the user; and
   display an image of the voice recognition result, and a second guide image including the second text information,
   wherein the second text information, for guiding another voice utterance, is associated with the first voice input received through the external remote controller.

2. The display apparatus according to claim 1, wherein the second text information includes a plurality of example texts guiding the user to utter a text included in each of example texts, the plurality of example texts being selected by the server.

3. The display apparatus according to claim 2, wherein the plurality of example texts are selected by the server based on user information received from the display apparatus, the user information comprising a user gender, a user age and a user hobby.

4. The display apparatus according to claim 2, wherein the plurality of example texts are selected by the server based on the data representing the first voice input.

5. The display apparatus according to claim 1, wherein the processor is further configured to, in response to a button for the function for voice recognition of the external remote controller being pressed, start performing the function for voice recognition of the display apparatus.

6. The display apparatus according to claim 5, wherein the processor is further configured to control the display to display the first guide image in response to the function for voice recognition of the display apparatus being performed.

7. The display apparatus according to claim 1, wherein the first guide image is displayed using a layer different from a layer in which a broadcasting screen is displayed, to be displayed together with the broadcasting screen.

8. The display apparatus according to claim 1, wherein the processor is further configured to display the second guide image by replacing the first guide image, based on adding the received second text information to the first text information.

9. The display apparatus according to claim 1, wherein the processor is further configured to display the second guide image by replacing the first guide image, based on replacing the first text information by the received second text information.

10. The display apparatus according to claim 1, wherein the memory is configured to store the first text information, and
    wherein the processor is configured to replace the stored first text information based on the received second text information.

11. A voice recognition guide method comprising:
    while a function for voice recognition of a display apparatus is performed, providing, at the display apparatus, a first guide image including first text information for guiding a voice utterance of a user;
    transmitting, at the display apparatus, data representing a first voice input received through an external remote controller to a server while the function for voice recognition is performed;
    after transmitting the data representing the first voice input, receiving, at the display apparatus, a voice recognition result and second text information for guiding another voice utterance of the user, from the server; and
    displaying, at the display apparatus, an image of the voice recognition result, and a second guide image including the second text information,
    wherein the second text information, for guiding another voice utterance, is associated with the first voice input received through the external remote controller.

12. The voice recognition guide method according to claim 11, wherein the second text information includes a plurality of example texts guiding the user to utter a text included in each of example texts, the plurality of example texts being selected by the server.

13. The voice recognition guide method according to claim 12, further comprising selecting, at the server, the plurality of example texts based on user information received from the display apparatus, the user information comprising a user gender, a user age and a user hobby.

14. The voice recognition guide method according to claim 12, further comprising selecting, at the server, the plurality of example texts based on the data representing the first voice input.

15. The voice recognition guide method according to claim 11, further comprising starting, at the display apparatus, in response to a button for the function for voice recognition of the external remote controller being pressed, to perform the function for voice recognition of the display apparatus.

16. The voice recognition guide method according to claim 15, further comprising displaying, at the display apparatus, the first guide image in response to the function for voice recognition of the display apparatus being performed.

17. The voice recognition guide method according to claim 11, further comprising displaying, at the display apparatus, the second guide image by replacing the first guide image, based on adding the received second text information to the first text information.

18. The voice recognition guide method according to claim 11, further comprising displaying, at the display apparatus, the second guide image by replacing the first guide image based on replacing the first text information by the received second text information.

19. A voice recognition system comprising:
- a display apparatus configured to communicate with external apparatuses; and
- a server configured to communicate with the display apparatus,
- wherein the display apparatus comprises:
  - a first memory;
  - a display configured to display an image; and
  - a first processor, executing programing instructions stored in the first memory, configured to:
    - control the display apparatus to, while a function for voice recognition of the display apparatus is performed, provide a first guide image including first text information for guiding a voice utterance of a user;
    - control the display apparatus to transmit data representing a voice input received through an external remote controller while the function for voice recognition is performed;
    - control the display apparatus to, after transmitting the data representing the voice input, receive a voice recognition result and second text information for guiding another voice utterance of the user from the server; and
    - control the display apparatus to display an image of the voice recognition result, and a second guide image including the second text information, and
- wherein the second text information, for guiding another voice utterance, is associated with the voice input received through the external remote controller.

20. The voice recognition system of claim 19, wherein the second text information includes a plurality of example texts guiding the user to utter a text included in each of example texts, the plurality of example texts being selected by the server.

21. The voice recognition system of claim 19, wherein the first processor is configured to display the second guide image by replacing the first guide image, based on the received second text information being added to the first text information.

22. The voice recognition system of claim 19, wherein the first processor is further configured to display the second guide image by replacing the first guide image, based on the received second text information replacing the first text information.

23. The voice recognition system of claim 20, wherein the plurality of example texts are selected by the server based on user information received from the display apparatus, the user information comprising a user gender, a user age and a user hobby.

24. The voice recognition system of claim 19, wherein the first memory is configured to store the first text information, and
- wherein the first processor is configured to replace the stored first text information based on the received second text information.

25. The voice recognition system of claim 20, wherein the plurality of example texts are selected by the server based on the data representing a first voice input.

* * * * *